United States Patent Office 3,509,117
Patented Apr. 28, 1970

3,509,117
PROCESS FOR THE MANUFACTURE OF POLYOLE-
FINS HAVING A BROAD MOLECULAR WEIGHT
DISTRIBUTION
Kurt Rust and Bernd Diedrich, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 21, 1967, Ser. No. 632,564
Claims priority, application Germany, Apr. 30, 1966, F 49,073
Int. Cl. C08f 1/44, 3/06, 15/04
U.S. Cl. 260—88.2                           4 Claims

ABSTRACT OF THE DISCLOSURE

Manufacture of the polyolefins having a broad molecular weight distribution and a high flow by polymerizing ethylene alone or in admixture with up to 5% by weight of butene-(1) or propylene according to the low pressure process by using as reduced titanium compound of the catalyst system a mixture consisting of the solid reaction product of $TiCl_4$ with alkyl aluminum compounds containing chlorine and of the solid reaction product of $TiCl_4$ with aluminum.

---

The present invention relates to a process for the manufacture of polyolefins having a broad molecular weight distribution.

It is known that ethylene can be polymerized with organo-aluminum compounds and titanium compounds under low pressure to yield polyethylene. A known, industrially important catalyst system consists of:

(a) a solid reaction product of $TiCl_4$ with aluminum-alkyl compounds containing chlorine, such as diethyl-aluminum monochloride or ethylaluminum sesquichloride, and (b) diethylaluminum monochloride as activator.

For regulating the molecular weight hydrogen is used in known manner.

Polyethylene produced in the presence of this catalyst system has a relatively broad molecular weight distribution.

The molecular weight distribution especially influences the flow properties of the melt. The flow rate of the melt can be increased by broadening the molecular weight distribution. For extrusion purposes polymers having a broad molecular weight distribution are, therefore, preferred in many cases to those having a narrow distribution, on account of the higher flow rate.

A higher rate of flow of the melt can also be obtained by using polymers which have a low molecular weight; this, however, adversely affects the mechanical properties depending on the molecular weight.

According to the process disclosed in Belgian Patent 655,984 polymers having a broad molecular weight distribution are obtained by carrying out the polymerization in at least two polymerization zones or reactors in which different reaction conditions are established, such as different amounts of regulating agents, for example hydrogen, or different catalyst concentrations.

According to a proposal not belonging to the state of the art polyethylene having a broad molecular weight distribution is obtained by using as titanium-containing component of the catalyst system a mixture of trivalent titanium compounds prepared by reducing $TiCl_4$ and $Ti(OR)_2Cl_2$ with chlorine-containing organo-aluminum compounds.

The present invention provides a process for the manufacture of polyolefins having a particularly broad molecular weight distribution $$\left(\frac{Mw}{Mn}-1>9\right)$$

and a high flow, by polymerizing ethylene alone or copolymerizing ethylene in admixture with up to 5% by weight of butene-(1) or propylene according to the low pressure process in an inert solvent and with the use of mixed catalysts of the Ziegler type consisting of reduced titanium compounds and diethyl-aluminum monochloride as activator and regulating the molecular weight with the aid of hydrogen, which comprises using as reduced titanium compound a mixture of trivalent titanium compounds consisting of (a) 1 part of the solid reaction product of $TiCl_4$ with alkyl aluminum compounds containing chlorine, such as diethylaluminum monochloride or ethylaluminum sesquichloride, and (b) 0.1 to 1 part of the solid reaction product $TiCl_4$ with aluminum.

The titanium catalyst of the invention can be prepared by mixing 0.1 to 1 part of the solid reaction product of $TiCl_4$ and aluminum with 1 part of the solid reaction product of $TiCl_4$ with alkylaluminum compounds containing chlorine in an inert diluent and by using the mixture for the polymerization.

The mixture of the reduced titanium compounds can, however, also be prepared in an inert diluent by mixing 0.1 to 1 part of the solid reaction product of $TiCl_4$ with aluminum and 0.75 to 1.5 parts of ethylaluminum sesquichloride or 0.7 to 1.5 parts of diethylaluminum monochloride and dropwise adding to this suspension a solution of 1 part of $TiCl_4$ in an inert solvent at a temperature in the range of from 0° C. to 120° C., preferably 0° to 25° C.

Polymerization is carried out in known manner in inert dispersing agents, such as hexane, cyclohexane or hydrogenated diesel oil fractions boiling at a temperature in the range of from 140° to 220° C., at a temperature ranging from 50° to 120° C., preferably 70° to 85° C., and under a pressure in the range of from 1 to 20 atmospheres, advantageously 1 to 6 atmospheres.

As organic, chlorine-containing aluminum compounds for the polymerization diethylaluminum monochloride may be used.

Suitable gaseous olefins are ethylene or mixtures of ethylene with up to 5% by weight of butene-(1) and/or propylene.

The molecular weight of the polyolefins is regulated in known manner with hydrogen.

The polyolefins obtained have a particularly broad molecular weight distribution; the polymer melt, therefore, exhibits excellent flow properties and is especially suitable for being processed by extrusion. Cables, bottles and the like made therefrom have excellent utilitarian properties.

As measurement for the broadness of the molecular weight distribution is used the molecular heterogeneity (U-value) defined according to G. V. Schultz, J. makrom. Chemie, volume 1, page 131 [1943] as the ratio $$\left[\frac{Mw \text{ (weight average molecular weight)}}{Mn \text{ (number average molecular weight)}}-1\right]$$

Polyethylene produced in the presence of a catalyst system consisting of (a) the solid reaction product of $TiCl_4$ with chlorine-containing alkylaluminum compounds and (b) diethylaluminum monochloride as activator has a U-value $$\left(\frac{Mw}{Mn}-1\right)$$

in the range of from 6 to 8 at a reduced specific viscosity of 2.7, determined in a 0.1% by weight solution in xylene.

Polyethylene produced with a catalyst system consisting of (a) The solid reaction product of $TiCl_4$ with aluminum ($TiCl_3AA$ manufactured by Stauffer Chemical Company U.S.A.) and (b) diethylaluminum monochloride as activator has a U-value $$\left(\frac{Mw}{Mn}-1\right)$$

of 4 to 8 at a reduced specific viscosity of 2.7, determined in a 0.1% by weight solution in xylene.

As compared therewith the mixture of trivalent titanium compounds according to the invention consisting of (a) the solid reaction product of $TiCl_4$ with chlorine-containing alkyl aluminum compounds and (b) the solid reaction product of $TiCl_4$ with aluminum permits to produce, in the presence of diethylaluminum monochloride as activator, polyethylenes or copolymers of ethylene with 5% by weight of butene-(1) or propylene having a U-value $$\left(\frac{Mw}{Mn}-1\right)$$

in the range of from 10 to 18 at a reduced specific viscosity of 2.7, determined in a 0.1% by weight solution in xylene.

It was surprising and could not be foreseen by an expert that the broad molecular weight distribution provided by the systems of a solid reaction product of $TiCl_4$ with alkyl aluminum compounds containing chlorine in combination with dialkylaluminum monochloride as activator or of the solid reaction product of $TiCl_4$ with aluminum in combination with diethylaluminum monochloride as activator, individually, is further broadened to a considerable extent by the titanium component of the invention, i.e. a mixture of the solid reaction product of $TiCl_4$ with chlorine-containing alkylaluminum compounds and the solid reaction product of $TiCl_4$ with aluminum in admixture with diethylaluminum monochloride as activator.

The considerable technical progress of the process for the manufacture of polyolefins having a very broad molecular weight distribution according to the invention is due to the fact that a change of the polymerization conditions as described in the reference cited above is not required during the polymerization so that the present process can be carried out continuously in a simple technical manner.

The following examples serve to illustrate the invention but they are not intended to limit it thereto.

EXAMPLE 1

(a) Preparation of the solid reaction product of $TiCl_4$ with ethylaluminum sesquichloride A four-necked flask having a capacity of 500 cc. was charged, with the exclusion of air and moisture, with 200 milliliters of an inert diesel oil fraction free from olefins (boiling point 180° to 210° C.) and 37 grams (150 millimols) of ethylaluminum sesquichloride and 38 grams (200 millimols) of $TiCl_4$ were added dropwise at 20° C. over a period of 4 hours. A fine brown precipitate separated. To complete the reaction the mixture was stirred at 20° C. for 10 hours whereupon the mother liquor was decanted and the precipitate was washed four times, each time with 200 milliliters of the above mentioned diesel oil fraction.

(b) Polymerization

A polymerization vessel having a capacity of 10 liters was charged, with the exclusion of air and moisture, with 7 liters of a diesel oil fraction (boiling point 180°–210° C.). A solution of 16.8 grams (140 millimols) of diethylaluminum monochloride in 200 cc. of a diesel oil fraction boiling at 180° to 210° C. was added and the whole was heated at 80° C.

At this temperature, 70 millimols of a titanium catalyst consisting of 35 millimols of the solid reaction product of $TiCl_4$ and ethylaluminum sesquichloride described (sub 1a) and 35 millimols of the solid reaction product of $TiCl_4$ with aluminum ($TiCl_3AA$ of Stauffer Chemical Company) were added and the polymerization was carried out by introducing ethylene and hydrogen.

After a period of 5 hours, the catalyst was decomposed at 70° C. by adding 200 cc. of n-butanol, and the mixture was stirred three times with water. After filtration, distillation with steam and drying, 1,650 grams of polyethylene were obtained having a reduced specific viscosity of 2.8, measured in a 0.1% by weight solution in xylene. The polymer had a U-value $$\frac{Mw}{Mn}-1$$

of 17.5. When bottles were made by the blowing process on the extruder the polyethylene was distinguished by a high flow and the bottles had a smooth surface without graining.

EXAMPLE 2

(a) Preparation of the titanium catalyst

A flask having a capacity of 1,000 cc. was charged, with the exclusion of air and moisture, with 400 cc. of a diesel oil fraction (boiling point 180°–210° C.), 60 millimols of the solid reaction product of $TiCl_4$ with aluminum ($TiCl_3AA$ of Stauffer Chemical Company) and 57 grams (230 millimols) of ethylaluminum sesquichloride. Said solid reaction product is titanium trichloride-aluminum trichloride having, reportedly, substantially the formula $TiCl_3 \cdot \frac{1}{3} AlCl_3$ and is obtainable by reduction of titanium tetrachloride with metallic aluminum at high temperatures.

At 0° C. 40 grams (210 millimols) of $TiCl_4$ in 70 milliliters of a hydrogenated diesel oil fraction free from olefins, $H_2O$, S and O and boiling at 130°–160° C. were dropped into the suspension while stirring over a period of 2 hours. To complete the reaction the mixture was kept for 2 hours at 0° C. and for another 2 hours at 20° C. The supernatant solution was decanted and the separated titanium catalyst was washed four times, each time with 300 cc. of the above-mentioned diesel oil fraction.

(b) Polymerization

A polymerization vessel having a capacity of 10 liters was charged, with the exclusion of air and moisture, with 7 liters of a diesel oil fraction (boiling point 180–210° C.). A solution of 16.8 grams (140 millimols) of diethylaluminum monochloride in 200 cc. of the above-mentioned diesel oil fraction was added and the mixture was heated at 80° C. At this temperature 70 millimols of the titanium catalyst described (sub 2a) were added and the polymerization was carried out by introducing ethylene and hydrogen.

After a period of 5 hours, the catalyst was decomposed at 70° C. by adding 200 cc. of n-butanol and the reaction mixture was stirred three times with water. After filtration, distillation with steam and drying 1,900 grams of polyethylene were obtained having a reduced specific viscosity of 2.7, determined in a 0.1% by weight solution in xylene. The U-value $$\frac{Mw}{Mn} - 1$$

of the polymer was 14.3.

What is claimed is:

1. In the process of manufacturing polyolefins having a broad molecular weight distribution and a high flow rate in the molten state comprising polymerizing ethylene or copolymerizing ethylene with up to 5% by weight of butene-(1) or propylene in inert solvents at a temperature in the range of 50 to 120° C. and a pressure of from 1 to 20 atmospheres with a Ziegler type mixed catalyst consisting of reduced titanium compounds and diethylaluminum monochloride as activator with regulation of the molecular weight by means of hydrogen, the improvement comprising employing as the reduced titanium compound during polymerization a mixture of trivalent titanium compounds consisting of (a) 1 part by weight of the solid reaction product of $TiCl_4$ with diethylaluminum monochloride in a molar ratio of 1:0.7 to 1:1.5 or of $TiCl_4$ with ethylaluminum sesquichloride in a molar ratio of 1:0.75 to 1:1.5, said solid reaction product being formed at a temperature of from 0 to 120° C. and (b) 0.1 to 1 part of titanium trichloride-aluminum trichloride obtained by reducing titanium tetrachloride with metallic aluminum.

2. The process of claim 1 wherein (a) is formed at a reaction temperature of from 0 to 25° C.

3. The process of claim 1 wherein (a) is formed in the presence of (b) by the dropwise addition of a solution of $TiCl_4$ into a suspension prepared by mixing said ethylaluminum sesquichloride and (b) in an inert diluent.

4. The process of claim 1 wherein (a) is formed in the presence of (b) by the dropwise addition of a solution of $TiCl_4$ into a suspension prepared by mixing said diethylaluminum monochloride and (b) in an inert diluent.

References Cited

UNITED STATES PATENTS

| | | | |
|---|---|---|---|
| 3,032,510 | 5/1962 | Tornqvist et al. | 260—93.7 |
| 3,051,690 | 8/1962 | Vandenberg | 260—88.2 |
| 3,314,930 | 4/1967 | Nagel | 260—93.7 |
| 3,342,793 | 9/1967 | Palvarini et al. | 260—93.7 |
| 3,365,434 | 1/1968 | Coover et al. | 260—93.7 |
| 3,388,076 | 6/1968 | Lamborn | 252—429 |
| 3,394,118 | 7/1968 | Boor | 260—93.7 |

FOREIGN PATENTS 866,679  4/1961  Great Britain.

JOSEPH L. SCHOFER, Primary Examiner

E. J. SMITH, Assistant Examiner

U.S. Cl. X.R.

252—429; 260—94.9